March 30, 1954 V. G. JOHNSON 2,673,744
FOLDABLE PORTABLE SLED
Filed Jan. 21, 1952 2 Sheets-Sheet 1
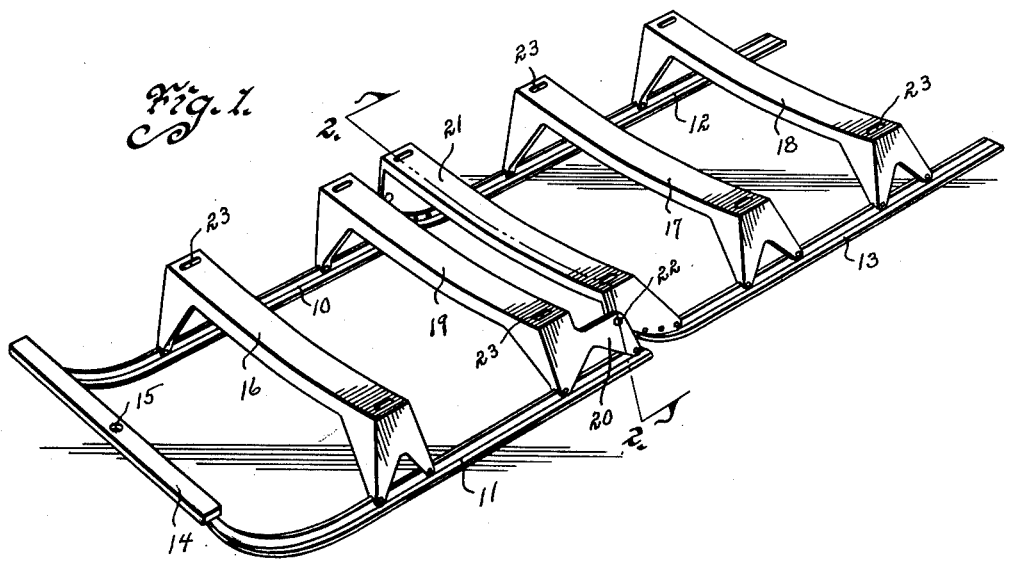
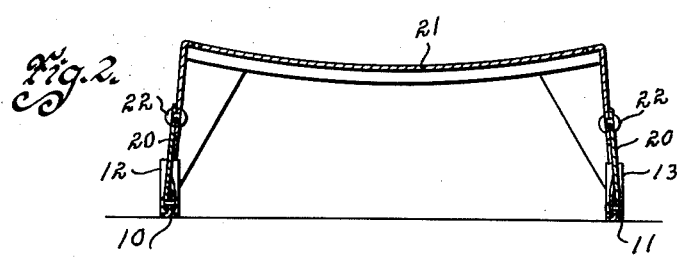
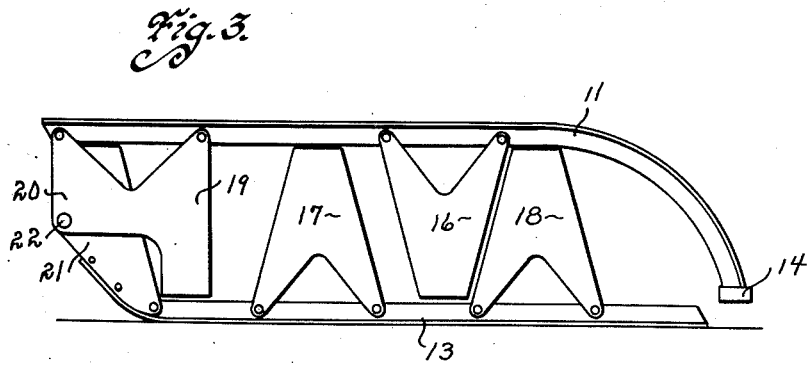
Inventor
Venner G. Johnson
by Talbert Dick & Adler
Attorneys
Witness
Edward P. Seeley March 30, 1954 V. G. JOHNSON 2,673,744
FOLDABLE PORTABLE SLED
Filed Jan. 21, 1952 2 Sheets-Sheet 2
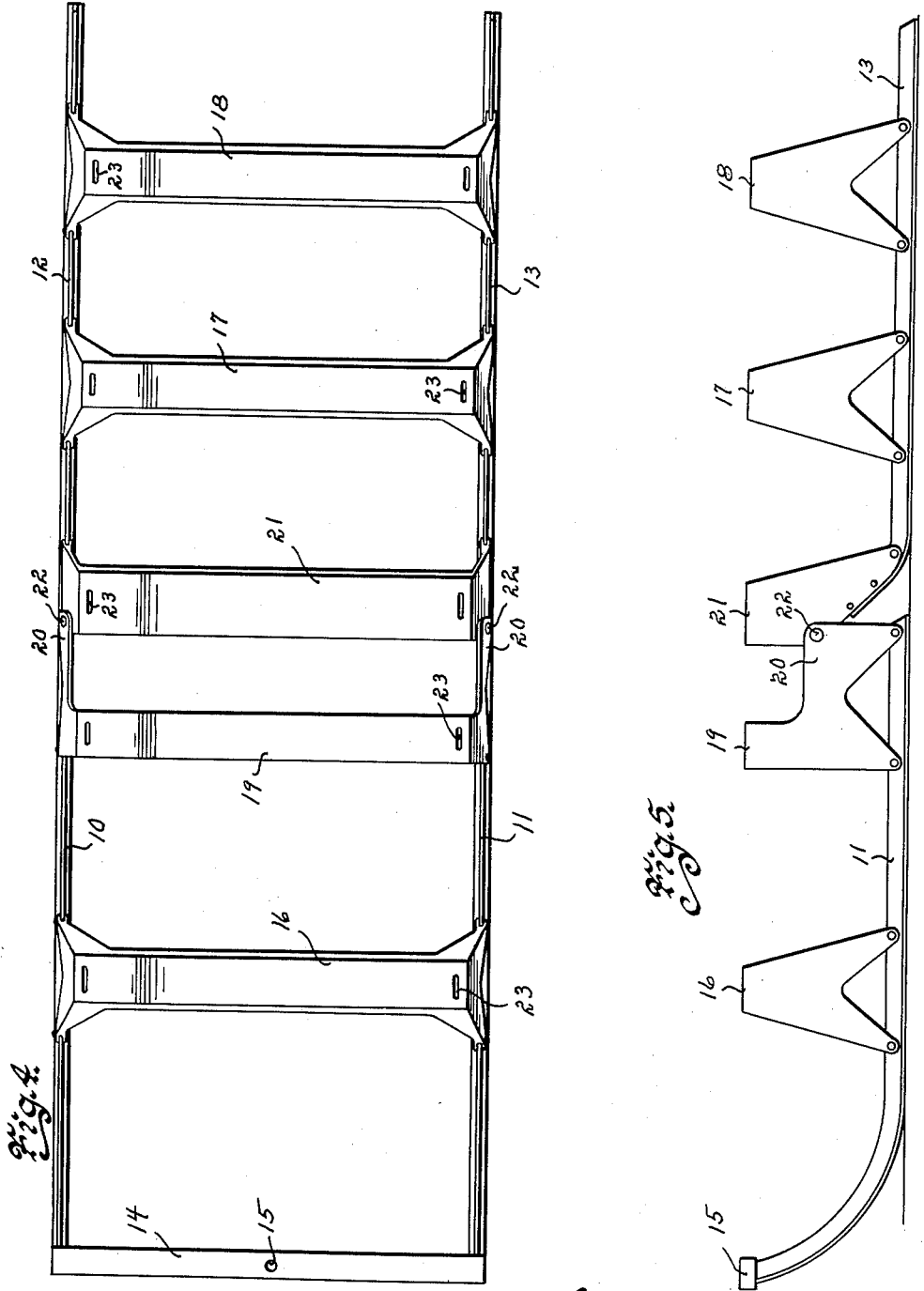

Patented Mar. 30, 1954

2,673,744

UNITED STATES PATENT OFFICE 2,673,744

FOLDABLE PORTABLE SLED

Venner G. Johnson, Des Moines, Iowa

Application January 21, 1952, Serial No. 267,473

4 Claims. (Cl. 280—20)

1

This invention relates to ice, snow, and land sleds.

Sleds now sold to the public are excellent for general usage, but are objectionable for certain specific purposes. In large game hunting it is often desirable to sled the killed animal from the point of kill. Ordinary sleds, however, are objectionable for this purpose due to their size and weight. They cannot be easily carried, and at places of bad terrain, it is often necessary to portage them as well as the game or other burden being being carried by the sled over suitable ground. Obviously, if common sleds were light of weight, small of size, and foldable, the hunter could carry the same on his back when he goes hunting. Then in case of a kill the sled would be available. While I have referred to sleds for hunters usage, it is obvious that there is also a need for a light weight foldable sled for other purposes, such as equipment in "survival" kits carried by airplanes flying over remote frozen areas.

Therefore, the principal object of my invention is to provide a light weight sled that may be folded or collapsed into a compact unit when not in use.

A still further object of this invention is to provide a strong foldable sled that is of relatively long length when extended, thereby providing maximum carrying capacity.

A still further object of this invention is to provide a foldable sled that is economical in manufacture, durable in use, and refined in appearance.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of my sled, extended and ready for use.

Fig. 2 is a cross-sectional view of my sled taken on line 2—2 of Fig. 1.

Fig. 3 is a side view of the sled in folded condition.

Fig. 4 is a top plan view of my sled in extended condition.

Fig. 5 is a side view of the sled in extended condition.

I have used the numerals 10 and 11 to designate the two runners of the leading unit of the sled and the numerals 12 and 13 to designate the two

2 runners of the trailing unit, as shown in Fig. 1.

The front sled unit has the front end portions of its two runners curved forwardly and upwardly and are joined together with the bar 14. The numeral 15 designates a hole in the center of the bar 15 for the attaching of a rope, cable, or the like.

The numeral 16 designates a four leg bench portion secured at its two ends to the top portion of the two runners 10 and 11, respectively.

The numerals 17 and 18 designate two spaced apart and similar bench portions secured at their two ends to the top portion of the two rear runners 12 and 13, respectively.

The numeral 19 designates a bench portion secured to the rear end portion of the two leading runners 10 and 11, respectively. This bench portion 19 differs from the heretofore benches in that its two rear or trailing legs are offset to the rear to provide a hingle flange portion 20, as shown in Fig. 5. These flange portions rest in the rear of the vertical plane of the top of the bench 19.

The numeral 21 designates a bench portion having its two ends secured to the extreme forward ends of the two runners 12 and 13, respectively. The two end portions of this bench have their leading portions extending to the inside of the flanges 20, as shown in Fig. 4. These two bench ends and the flanges 20 are hinged together by the two rivets 22, respectively. The pivot points of these two rivets are approximately one-half of the height of the benches. The tops of all benches, including the pull bar are in a common horizontal plane, when the sled is extended, as shown in Fig. 5. By this arrangement, a common surface is provided for the placement of objects to be carried. I find that for carrying some objects, it is advantageous to slightly concave the tops of the benches longitudinally of their length and this tends to hold objects carried by the sled. Holes or slots 23 may be imposed at different places in the bench portions for use of straps, ropes or like for securing items onto the sled.

To collapse the sled, the front unit is manually lifted upwardly and then swung rearwardly and downwardly onto the rear unit, as shown in Fig. 3. Or if desired, the rear unit may be lifted upwardly and then swung forwardly onto the front unit, leaving the front runners in contact with the snow or ground. In either case, the device may be used as a sled having approximately one-half capacity. Then when a larger sled is desired, it may be quickly extended to full length. When the sled is collapsed it is very compact and is easily carried. While the sled may be made of any suitable material, I recommend that it be made of light strong material such as aluminum. The bench or platform portions may be secured to the respective runners by any suitable means such as spot welding, rivets, or the like. The placement of the benches relative to each other must be such that when the sled is folded they will "nest" with each other. In Fig. 3, when the sled is folded, the bench portion at the rear of the first unit rests to the rear of the forward bench of the rear unit, and the front bench of the first unit will extend between the two rear bench portions of the trailing unit. For strength the top length of bench and legs may have edge flange or web portions extending inwardly as shown in Fig. 1 and Fig. 2. By the sled being flexibly connected at its center length, it will automatically conform to uneven terrain. With the forward ends of the runners of both units curved forwardly and upwardly, both units will easily sled over uneven surfaces and objects.

Some changes may be made in the construction and arrangement of my foldable portable sled without departing from the real spirit and purpose of my invention, and it is my intention to cover by my claims, any modified forms of structure or use of mechanical equivalents which may be reasonably included within their scope.

I claim:

1. In a sled, two spaced apart front runners having their forward ends curved upwardly and forwardly, two spaced apart rear runners having their forward ends curved upwardly and forwardly, bench platforms on said two front runners, bench platforms on said two rear runners, and a means for hingedly securing the rear bench platform on said two front runners to the front bench platform on the two rear runners; said means for hingedly securing the rear bench platform on said two front runners to the front bench platform on said two rear runners being on a substantially horizontal axis.

2. In a sled, two spaced apart front runners having their forward ends curved upwardly and forwardly, two spaced apart rear runners having their forward ends curved upwardly and forwardly, bench platforms on said two front runners, bench platforms on said two rear runners, and a means for hingedly securing the rear bench platform on said two front runners to the front bench platform on the two rear runners about a horizontal axis; said bench platforms on said front runners being so arranged thereon relative to the arrangement of the bench platforms on said rear runners that when said front and rear runners are folded together said front bench platforms will nest with said rear bench platforms.

3. In a sled, two spaced apart front runners having their forward ends curved upwardly and forwardly, two spaced apart rear runners having their forward ends curved upwardly and forwardly, bench platforms on said two front runners, bench platforms on said two rear runners, and a means for hingedly securing about a horizontal axis the rear bench platform on said two front runners to the front bench platform on the two rear runners at points substantially one-half of the height of said bench platforms.

4. In a sled, two spaced apart front runners having their forward ends curved upwardly and forwardly, two spaced apart rear runners having their forward ends curved upwardly and forwardly, bench platforms on said two front runners, bench platforms on said two rear runners, and a means for hingedly securing on a horizontal axis the rear bench platform on said two front runners to the front bench platform on the two rear runners at points substantially one-half of the height of said bench platforms and a bar between the front ends of said two front runners.

VENNER G. JOHNSON.

References Cited in the file of this patent

UNITED STATES PATENTS

| Number | Name | Date |
|---|---|---|
| 412,062 | Ames | Oct. 1, 1889 |
| 1,197,084 | Walter | Sept. 5, 1916 |
| 1,453,948 | Pottala | May 1, 1923 |
| 1,585,293 | Legare | May 18, 1926 |

FOREIGN PATENTS

| Number | Country | Date |
|---|---|---|
| 182,831 | Switzerland | May 16, 1936 |
| 207,925 | Germany | Mar. 15, 1909 |
| 574,980 | France | Apr. 10, 1924 |